Dec. 14, 1948.  A. O. ACKERMAN  2,456,238

MEANS FOR ENTRAPPING CONDENSATION

Filed Sept. 15, 1944

INVENTOR.
ARTHUR O. ACKERMAN
BY James M. Abbett
ATTY.

Patented Dec. 14, 1948

2,456,238

UNITED STATES PATENT OFFICE 2,456,238

MEANS FOR ENTRAPPING CONDENSATION

Arthur O. Ackerman, Fullerton, Calif.

Application September 15, 1944, Serial No. 554,301

3 Claims. (Cl. 138—25)

This invention relates to electric conduits, and particularly pertains to a means of entrapping condensation.

When electric conductors are laid underground it is the usual practice to place them in conduits even though the conductors have been previously wrapped or covered with insulating material. It has been found that due to the heat generated by the resistance of the conductor to the flow of electricity and variation in temperature and humidity within the conduits the air within the conduits will condense at times, and this accumulated moisture will cause deterioration of the insulating covering on the conductors. This makes it necessary to withdraw all of the damaged wire from the conduits and to replace the wire with properly insulated conductors. In many instances, as for example in large army cantonments, this replacement expense represents an enormous financial outlay. It is desirable, therefore, to provide means for insuring that the insulated electric conductors will be maintained in an environment in which the insulation will not deteriorate. It is the principal object of the present invention, therefore, to provide a method and means of entrapping condensation, which accumulates in conduits, and which may be applied to conduits placed underground or otherwise, and which device will receive and entrap the moist air developed in a conduit through which electric conductors are led, the device acting to localize condensation of the moisture and to permit it to be dissipated, whereby the interior of the conduits will be maintained substantially moisture-free.

The present invention contemplates the provision of tubular conduits having openings through the walls thereof at intervals, the area of the conduit at the openings being housed within a condensation trap within which moisture may condense and from which moisture may be dissipated.

The invention is illustrated by way of example in the accompanying drawings in which.

Figure 1:
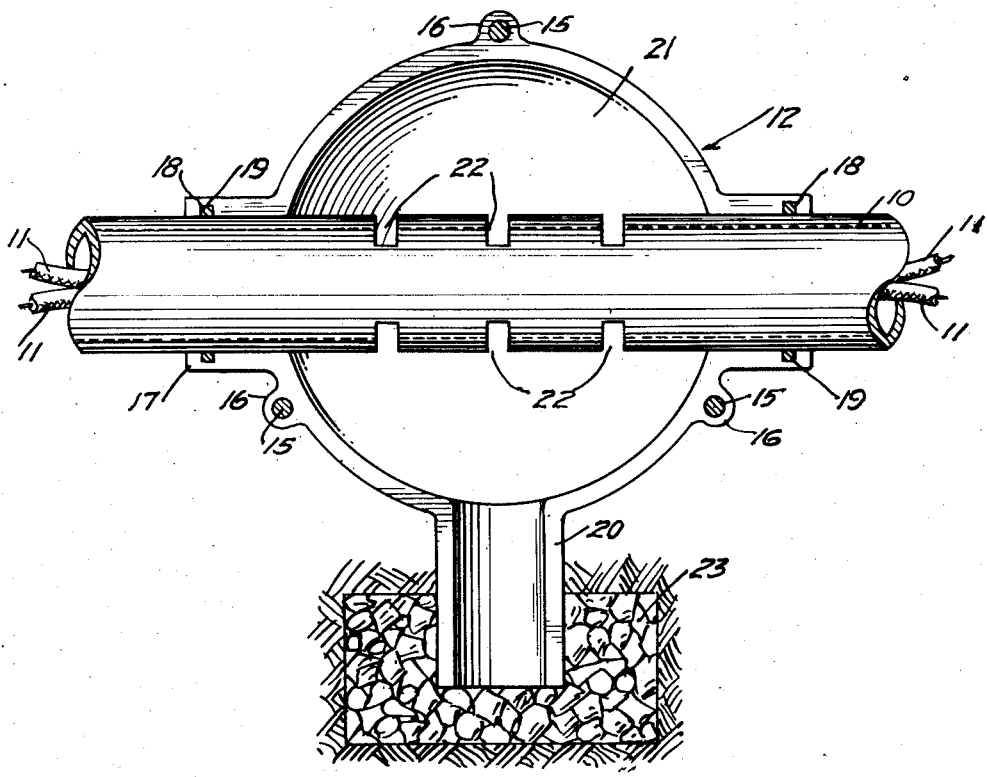
Figure 1 is a view in longitudinal section and elevation showing a preferred form of the present invention.

Referring more particularly to the drawings, 10 indicates a tubular conduit, such as is used to house an electric conductor 11. This conduit may be assembled in sections and connected in any suitable manner. One or more conductors 11 may be enclosed within the conduit. The conduits 10 are usually constructed of metal, although they are sometimes made of vitreous material. In any event there is a space within them occupied by air, and this air may have a variable moisture content. It is well known that the resistance to the flow of electricity through the conductors 11 creates heat which tends to vaporize the moisture in a conduit, such as the conduit 10. It will also be recognized that temperature changes in the air or soil around a conduit will tend to affect the vapor state of the moisture within a conduit. Thus, when such changes do take place, either due to atmospheric conditions or to variation in current flow through the conductors, there is a tendency for the air to be heated within the enclosing conduit, to vaporize the moisture, and to cool, so that the moisture vapor will condense. Under present conditions this condensation attacks the insulated walls of the conductors and tends to cause them to deteriorate. The present invention is concerned with means for drawing off this condensation from the conduits and dissipating it so that the air within the conduits will be substantially moisture-free regardless of temperature change.

The structure for accumulating condensation from conduit 10 and for dissipating this condensation includes a dome-shaped housing 12. This housing is preferably made in two sections, indicated at 13 and 14. The two sections each represent a hemispherical shell separated along an equatorial plane and clamped together by bolts 15 which pass through bolting flanges or lugs 16. At diametrically opposite sides of the shell members are hub portions 17 which embrace the conduit 10. If desired a packing groove 18 may be formed in the hub portions to carry a packing ring 19 so that a fluid-tight seal will be formed around the conduit 10 and between it and the hub portions so that the interior of the housing 12 will be air-tight. At right-angles to the horizontal axis of the housing 12 drain sections 20 are formed as a part of the members 13 and 14. These drain sections combine to produce a spout in communication with the spherical chamber 21 which is formed within the housing 12. It is to be understood that the housing 12 is here shown as being split equatorially so that the housing may be placed around the conduit 10 at any selected position without making it necessary to thread the conduit through the housing. It will also be understood that the housing might be in a different shape from that shown, and that its parts might be separated along different planes. In any event, the housing 12 forms an enlarged chamber 21 through which the conduit 10 passes. In the length of conduit which occurs within the condensation chamber 21 openings 22 are formed through the walls of the conduit. These openings may be formed in the lower side of the wall, and if desired may be formed in the upper side and other portions of the wall. As here shown, the openings are merely transverse slits cut with a hacksaw. It will be recognized that if the moisture condenses within the conduit 10 it may readily drain into the trap 12 through the openings 22 in the lower side of the conduit, and that in the event vapors are created within the conduit these may pass out through the lower slits or the upper slits 22. The lower end of the drain spout 20 may extend into a gravel sump 23 so that the moisture draining from the spout 20 may be dissipated out through the gravel and into the soil when the structure is buried below the ground level, indicated at 24.

In operation of the present invention one or more conductors 11 may be placed in a conduit 10 or may be threaded through a conduit 10 after the conduit has been connected at the ends of sections. In the event that the wiring is to be buried in the ground the conduit 10 may be formed with the openings 22 at desired intervals throughout the length thereof, and the housings 12 may then be assembled around the conduit 10 as indicated in Fig. 1 of the drawings. Here it will be seen that the hemispherical sections 13 and 14 are bolted in place by bolts 15, and that a spout 20 will be formed beneath the condensation chamber 21. It will also be seen that the hub portion 17 will clamp around the conduit to hold the packing 19 against the conduit and produce a fluid-tight joint. When a current load is imposed upon the conductors 11 the resistance to current flow will raise the temperature within the conduit and the moisture in the air will tend to vaporize. This vapor will flow along and within the conduit and when it reaches the condensation chambers 21 it will have an opportunity to expand. Thus, as temperature changes take place the moisture will accumulate as condensation upon the spherical dome surface of the chamber 21 and will eventually be entrained into the spout 20. From this spout it will flow into the gravel sump 23. It will be evident that as vaporization and condensation continue to take place the interior of the conduits 10 will be dried and there will be no possibility of an objectionable accumulation of moisture taking place upon the surfaces of the insulating coating carried by the conductors.

Figure 2:
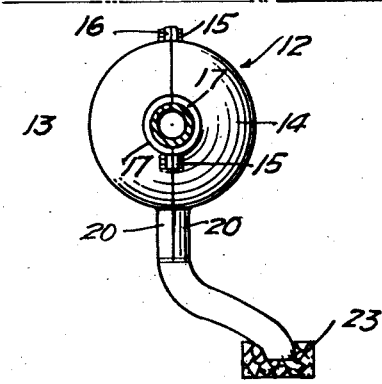
Fig. 2 is a view in end elevation showing the construction of the condensation trap as drawn at a reduced scale.

In Fig. 1 of the drawing the spout 20 leading to the sump 23 is shown as extending directly beneath the housing 12, while in Fig. 2 of the drawing the spout is shown as being curved so that the sump 23 will be at one side of the line of the conduit 10. This has advantages in that the moisture discharged from the spout 20 will be led away from the area directly beneath the member 12 so that excess amount of moisture will not be created directly beneath the conduit, and for the further reason that in the event moisture should tend to pass upwardly through the spout 20 it would condense on the walls of the spout and be entrained into the sump rather than to pass directly upwardly into the dome space 21.

It will thus be seen that by the simple and inexpensive arrangement here disclosed a condensation trap is provided which may be easily applied to conduits before or after laying them, and will insure that condensation tending to accumulate within the conduits may be readily drawn off and dissipated.

While I have shown the preferred method of accumulating and entrapping condensation, and the preferred apparatus for practising the same, it is to be understood that various changes may be made in the steps of the method and the combination, construction and arrangement of the parts by those skilled in the art, without departing from the spirit of the invention as claimed.

Having thus described my invention, what I claim and desire to secure by Letters Patent is:

1. In combination with a conduit for electric conductors and the like, which conduit has an opening through the wall thereof: a condensation trap comprising a shell-like structure adapted to embrace the conduit along the area in which the opening in the wall thereof occurs, the interior of said shell having a surface area substantially greater than the area of the length of conduit being embraced, whereby vapors passing from the conduit may condense upon the inner surface of said shell, the shell being formed with an opening through its lower wall through which said condensation may drain from the shell, and a drain spout communicating with said opening and extending downwardly and laterally to discharge moisture into an area of the soil which is not directly beneath the conduit.

2. A combined conduit and condensing unit, comprising a spherical shell, openings in the opposite sides of said shell lying along the equatorial center thereof, a conduit extending through the shell and through said openings, fluid sealing means between the walls of said openings and the conduit, drain vents through the walls of the conduit along the area within the shell, and a drain spout carrying accumulated condensate away from the interior of the spherical shell for drawing off surface condensation from within the shell.

3. A conduit and condensate trap, comprising a straight length of pipe, an area of which is formed with drain vents through the wall thereof, a spherical condensate trap of an inside area greater than the area of the length of conduit being embraced by the trap and through which length of conduit drain vents are formed, said condensate trap being formed with diametrically opposite openings through which the conduit extends, tubular fittings formed integral with the spherical condensate trap and circumscribing said openings and forming a substantially tight fit therewith, means forming a seal between said tubular fittings and said conduit, and a tubular drain vent extending from the wall of the spherical trap beneath the conduit.

ARTHUR O. ACKERMAN.

REFERENCES CITED

The following references are of record in the file of this patent:

UNITED STATES PATENTS

| Number | Name | Date |
| --- | --- | --- |
| 257,165 | Hill | May 2, 1882 |
| 299,347 | Chisholm | May 27, 1884 |
| 316,967 | Heber | May 5, 1885 |
| 322,018 | Smith et al. | July 14, 1885 |
| 393,346 | Whelan | Nov. 20, 1888 |
| 1,979,400 | Neilon | Nov. 6, 1934 |
| 2,024,742 | Parsons | Dec. 17, 1935 |
| 2,150,859 | Gibson et al. | Mar. 14, 1939 |

FOREIGN PATENTS

| Number | Country | Date |
| --- | --- | --- |
| 267,817 | Great Britain | Mar. 24, 1927 |
| 528,161 | Germany | 1931 |